United States Patent [19]

Williams

[11] 3,888,015

[45] June 10, 1975

[54] PRESETTING FIXTURE FOR CAM ACTUATED TURRET LATHES

[76] Inventor: Raymond H. Williams, P.O. Box 280, Chadwicks, N.Y. 13319

[22] Filed: Mar. 11, 1974

[21] Appl. No.: 449,858

[52] U.S. Cl.................................. 33/185 R; 33/185
[51] Int. Cl............................................ B27g 23/00
[58] Field of Search........ 82/34 R; 33/185 R, 181 R

[56] References Cited
UNITED STATES PATENTS

| | | | |
|---|---|---|---|
| 3,292,267 | 12/1966 | Wilterdink et al.................... | 33/185 |
| 3,557,465 | 1/1971 | Spalding.............................. | 33/185 |
| 3,676,935 | 7/1972 | Klausing.............................. | 33/185 |

*Primary Examiner*—Leonidas Vlachos
*Attorney, Agent, or Firm*—Bruns & Jenney

[57] ABSTRACT

A fixture for presetting cutting tools in the tool holders of a single spindle cam actuated turret lathe whereby set up time is substantially reduced. This invention simulates the position of a workpiece in relation to a turret end-forming tool by the use of the actual turret cam to be used for production. A rigid base with a protruding shaft provides a mount for the turret cam. A first slide, movable in a guideway in the base, has its position determined by a cam follower actuated by the lobes of the turret cam. Forming part of the slide are means to hold a turret tool holder. A second slide, also movable in the guideway, has length determining means and a reference pointer. With appropriate use of the length measuring means, the reference pointer will indicate the proper depth of the tool's shank within the tool holder. By use of a second measuring means on the second slide a tool, such as a boring tool, can be positioned off-center within the tool holder. An attachment permits a similar presetting of circular-forming tools within cross slide holders.

3 Claims, 11 Drawing Figures

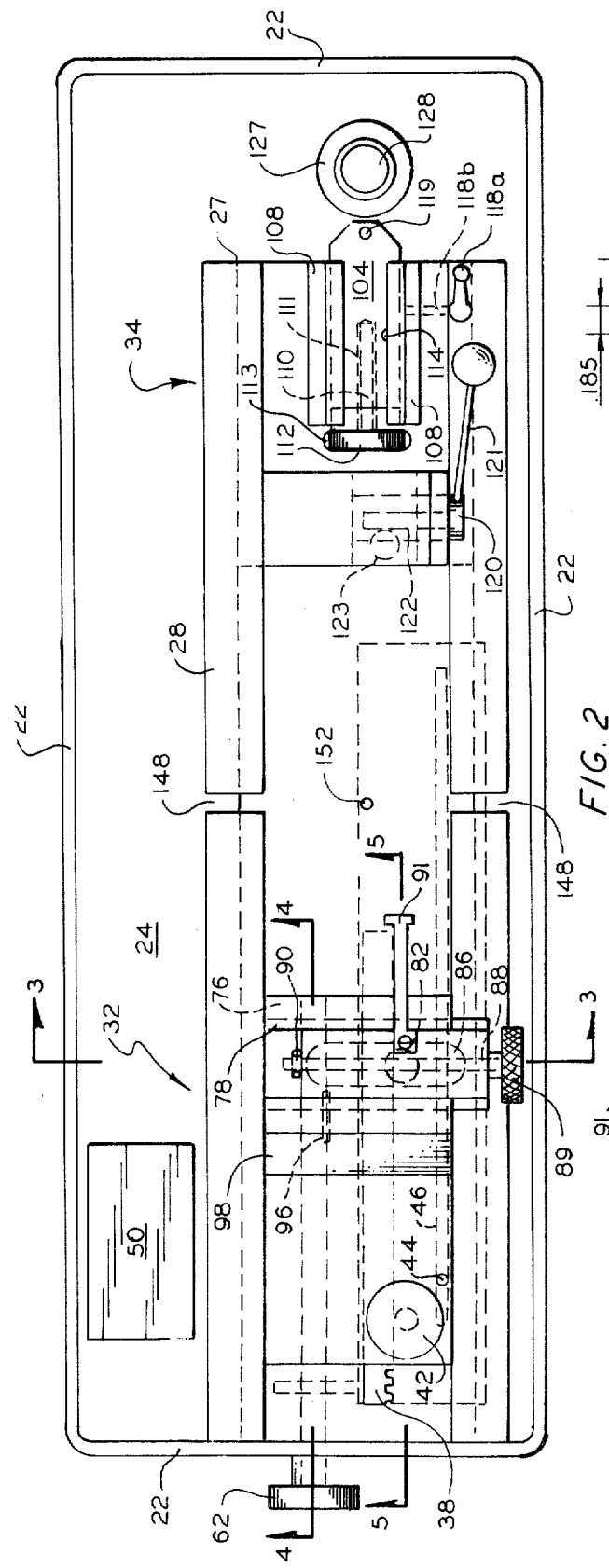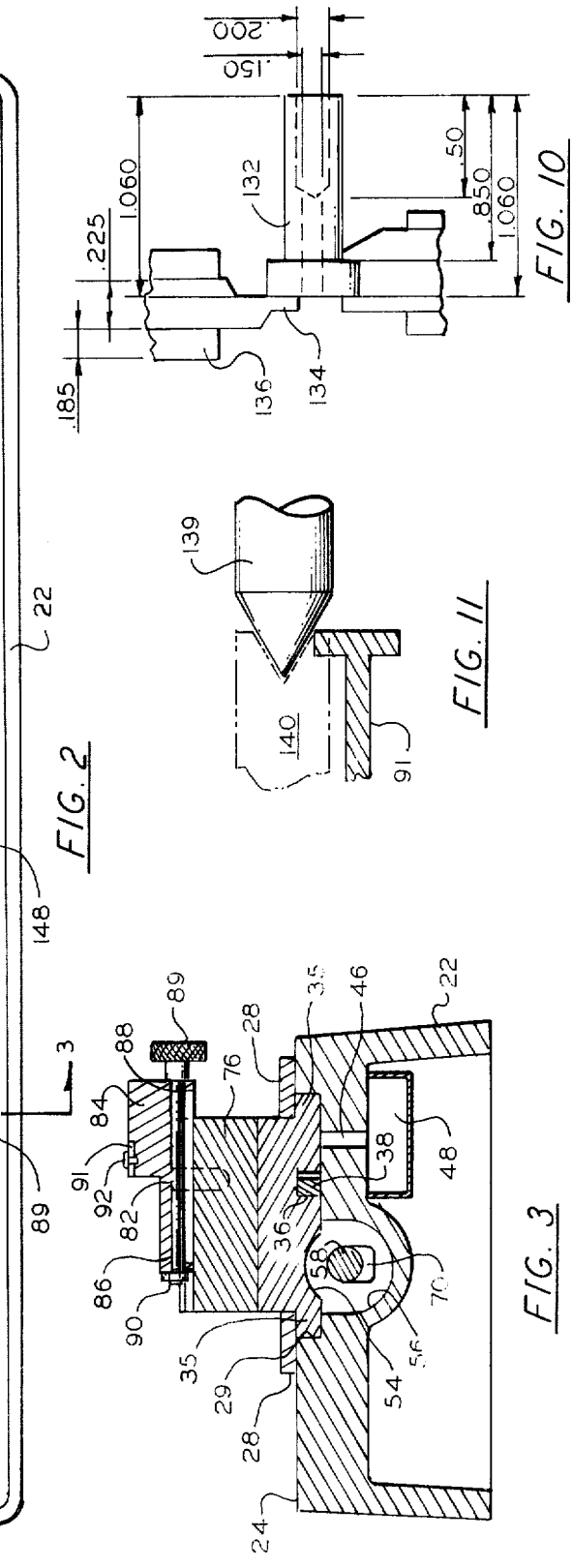

PRESETTING FIXTURE FOR CAM ACTUATED TURRET LATHES

BACKGROUND OF THE INVENTION

This invention relates generally to a presetting fixture for a single spindled cam actuated turret lathe, and has particular reference to a fixture for presetting circular-forming tools within the cross slide tool holders and end-forming tools within the turret tool holders of an automatic screw machine as the majority of the cam actuated turret lathes are called.

An automatic screw machine feeds a predetermined length of bar stock through a collet, creating a workpiece. A turret containing end-forming tools, and cross slides containing circular-forming tools, turn this workpiece into a finished part by milling, boring, drilling, etc. The cross slides are individually adjustable but the turret is positioned by a turret cam on a one to one ratio through a series of gears and levers.

A separate cam is cut for each new job but, while the cam is cut to approximately correspond to standard tool sizes, each time a job is set up the turret tools must be set within the turret tool holder by trial and error. This wasteful method of setting up is necessitated by such things as: wear on the cam lobes; variations in sizes of the tool holders of different machines; the difficulty in perfectly forming a cam; and since drills, taps and reamers are held in bushings within the tool holders their position with respect to these holders can't be accurately predicted by the cam maker.

Without means for presetting, the tool has heretofore been speculatively placed within the tool holder, brought into working contact with the workpiece and then repositioned if the result wasn't as desired. With this hit or miss method several workpieces are ruined for every tool set, resulting in a large waste of time and material for even the simplest set up. Also in all set ups, it is possible that problems may arise causing further waste and downtime. Some of the most common problems are: the cam may be defective and require reworking by the cam maker, the tool itself may be defective and require a replacement, a reamer may be ruined by positioning it so that it goes beyond the depth of the hole being reamed, or a threaded die head may lack some length and thereby require the resetting of all previously set tools.

Set up time can be very critical to the profitability of an automatic turret lathe as the overhead during set up is greater than during production. Obviously, there is a need for a method to preset the tools within the tool holders while the automatic turret lathe is free to continue production work.

To the best of the applicant's knowledge only two attempts have been made to solve this problem. The first is a device for measuring the tool positions after the job has been set up, the length being recorded for future set ups. The second method is a combination of mathematical computations and a presetting fixture such as used on a tape controlled machine.

The first of these methods has the obvious disadvantage of not being usable to preset the tool the first time the job is run. This is also a disadvantage in that some shops set up only once for each job. A further problem is that as the cams wear the tools must be reset within the holders, thereby making the recorded figures useless.

The mathematical computation method has the disadvantage of requiring standarized and calibrated tool holders. It also has the disadvantage that the computation could be inaccurate because of wear on the cam, lack of close tolerances in the production of the cam, an accumulation of errors in protracted calculations, and errors in converting the figures from the design to the mathematical formulas.

SUMMARY OF THE INVENTION

It is the purpose of this invention to provide a simple but accurate presetting fixture for single spindled cam actuated turret lathes, the majority of which are called automatic screw machines. Generally, the invention simulates an automatic screw machine with means representing a workpiece within a collet and means acting as a turret. By utilizing the actual turret cam employed in production to position the turret simulating means, and by using length determining means to position the workpiece simulating means, the correct position of turret cutting tools within the tool holder can be predetermined.

More specifically, this invention includes a heavy, rigid base to provide a non-slipping, sturdy foundation. Attached to this base is a fixed shaft for mounting the turret cam. Within a guideway on this base are two independent slides, the first to simulate the turret and the second to simulate the position of a workpiece within a collet. The position of the first slide is determined by the lobes of the turret cam. The second slide is initially positioned relative to the first slide by means indicating the maximum clearance between the outer diameter of the turret and the collet. Forming a part of the first slide are means for holding a turret cutting tool holder.

By appropriate use of a first measuring means, a reference point on the second slide can be positioned to indicate the desired depth of the tool within the workpiece. The tool is then placed in the holder relative to this reference point. By use of a second measuring means a tool such as a boring tool can be positioned off-center in the tool holder.

An attachment that can be mounted on the base, perpendicular to the second slide, simulates the cross slides of an automatic screw machine. Cross slide tool holders, and their circular-forming tools, are positioned on this attachment by use of the first measuring means and the reference point on said second slide. Appropriate means are then attached to the cross slide holders to indicate their proper positioning when they are transferred to the cross slides of an automatic screw machine.

Each turret tool holder with its tool properly positioned therein is now ready to be transferred to the turret of the machine and each cross slide tool holder and its properly positioned circular-forming tool is ready to be transferred to the cross slides. The automatic turret lathe can now be set up with the non-production time reduced from hours to minutes. There will be no waste material with all workpieces ending up as finished parts.

BRIEF DESCRIPTION OF THE DRAWINGS

FIG. 2 is a top view of the presetting fixture;

FIG. 3 is a transverse section through the fixture taken on line 3—3 of FIG. 2;

FIG. 10 is a diagram of a representative part; and

FIG. 11 is a diagram of a spot tool in working contact with a workpiece.

DESCRIPTION OF THE PREFERRED EMBODIMENT

Having reference now to the drawings - all directions listed as "right" or "left" are taken with reference to FIG. 2. "Right" refers to the right of the page; "left" to the left of the page.

Figure 1:
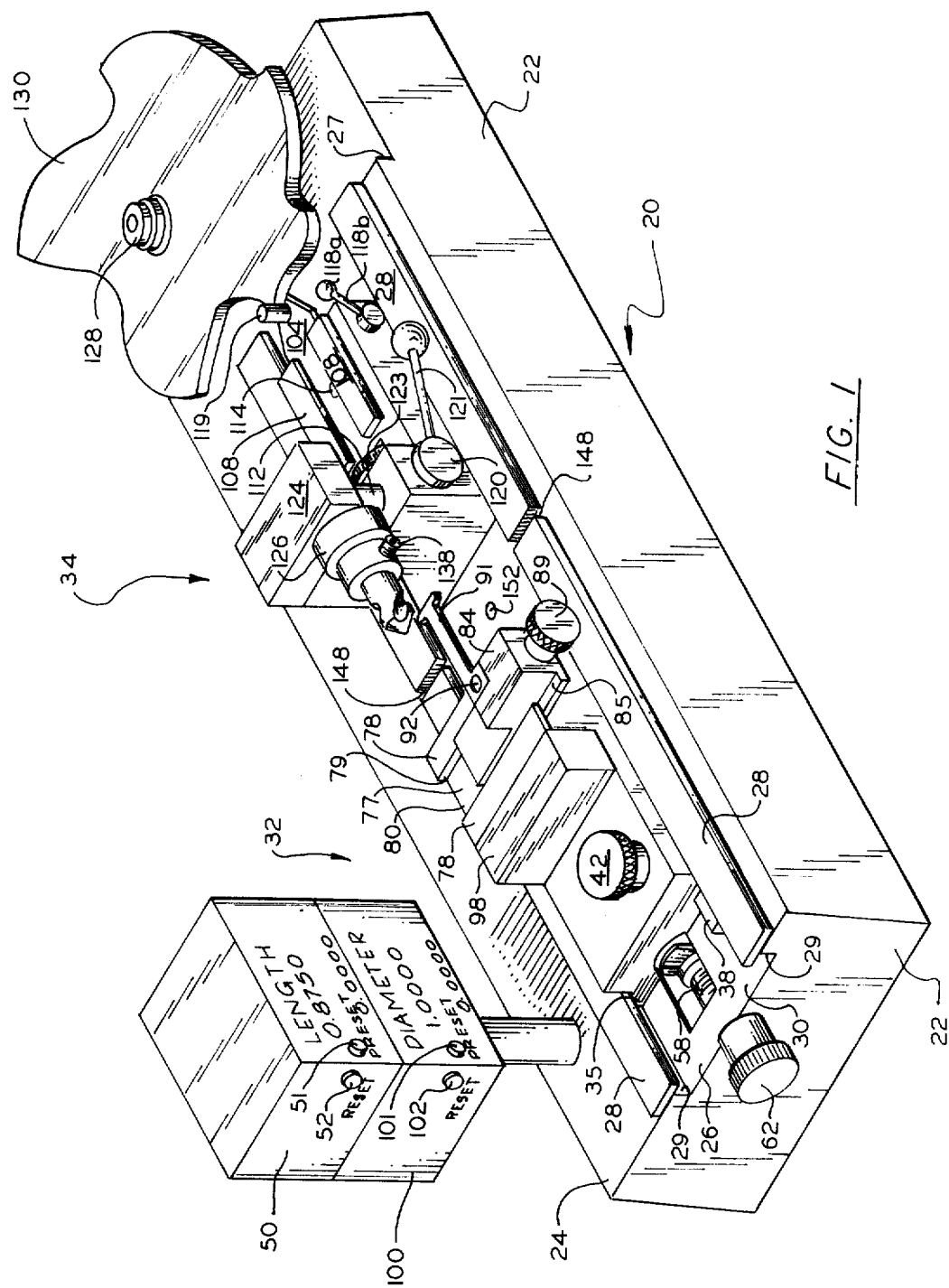
FIG. 1 is a perspective view of a presetting fixture embodying the invention.

Having particular reference now to FIG. 1, the presetting fixture of the invention includes a base, generally indicated by 20, comprising a single molding of cast iron. Said base consists of four side walls 22, supporting an upper surface 24, together forming a rectangular platform open at the bottom. The upper surface 24 of the base has a recess 26 running parallel to the longer of the side walls 22 and extending from the left edge of the upper surface 24 to a step down 27 on the right end of the base as seen in FIGS. 1 and 2.

Metal strips 28 are connected to the upper surface 24 of the base adjacent the side walls 29 of recess 26. Extending inwardly past the side walls 29, strips 28 form guides which, together with the lower surface of the recess, create a guideway 30. Within this guideway are two slides, the left slide 32 being herein referred to as the workpiece slide and the right slide 34 being herein referred to as the turret slide. Both the workpiece slide 32 and the turret slide 34 have side flanges 35 (FIGS. 3 and 7) dimensioned to fit beneath the guides 28, thereby securing the slides to the base 20 while permitting longitudinal movement in the guideway 30.

Figure 6:
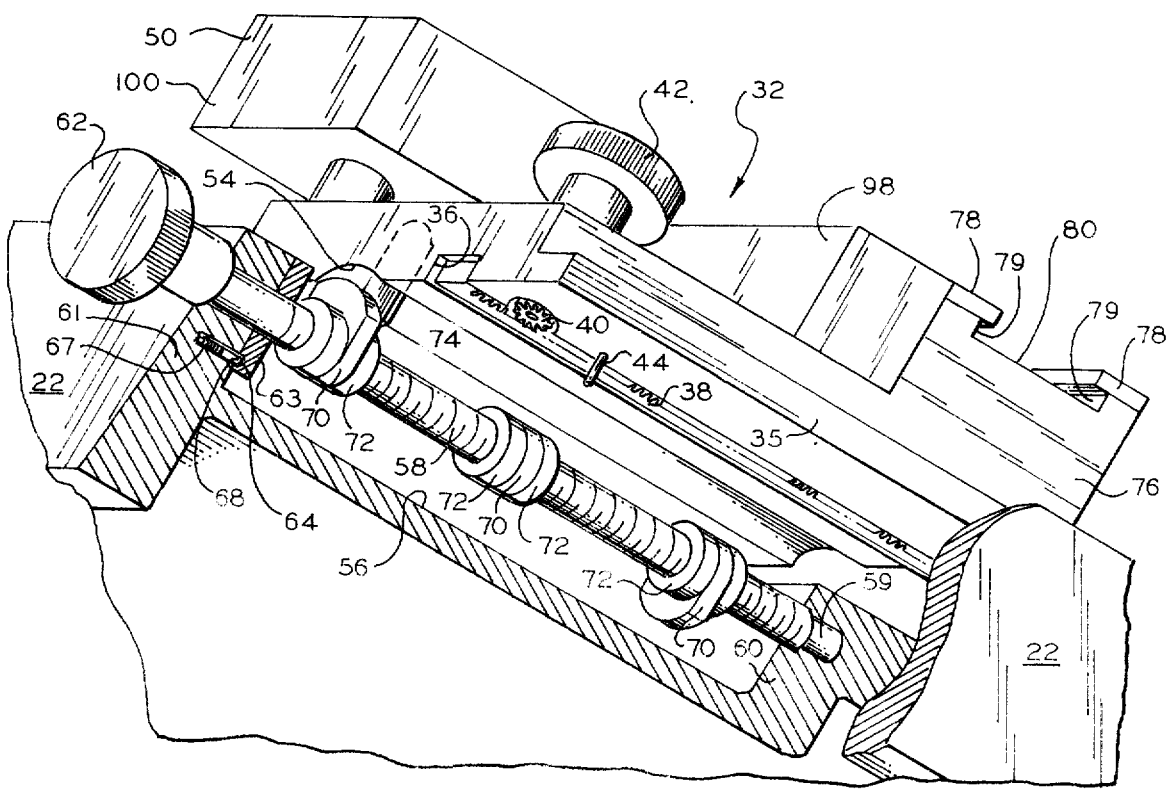
FIG. 6 is a fragmentary perspective view, with parts broken away, of the multiple stop knob and multiple stop rod.

Describing first the workpiece slide 32, said slide has a groove 36 in its lower surface positioned to receive a rack 38 secured to the bottom of the guideway as seen in FIGS. 3 and 6. Engaged with this rack is a pinion 40, as best seen in FIG. 6, which extends up through the slide to connect to knurled head 42, herein referred to as workpiece slide adjustment knob. By manually turning this workpiece slide adjustment knob, the pinion 40 acts on the rack 38 to cause the workpiece slide 32 to move along the guideway 30 in the desired direction. In the operation of this invention (to be described) it is necessary for this slide to have longitudinal movement through a distance equal to the maximum distance between the turret circumference and the collet. Accordingly, the rack 38 should be of a corresponding length.

Projecting from the bottom of the workpiece slide 32 is an actuator pin 44, FIG. 6. This pin passes through a longitudinally extending slot 46 in the upper surface 24 of the base and connects to a length encoder 48 attached to the underside of the surface 24, FIG. 3. This length encoder is a commercially available device and is not per se a part of this invention, as other length determining means could be substituted. The particular device employed in the embodiment disclosed herein can be purchased from Dynamic Research Corp. of Massachusetts and comes with an amplifier and digital readout device 50 having a preset knob 51 and a reset button 52. The slot 46 for pin 44 must be long enough so as not to restrict the movement of the slide 32.

Figure 4:
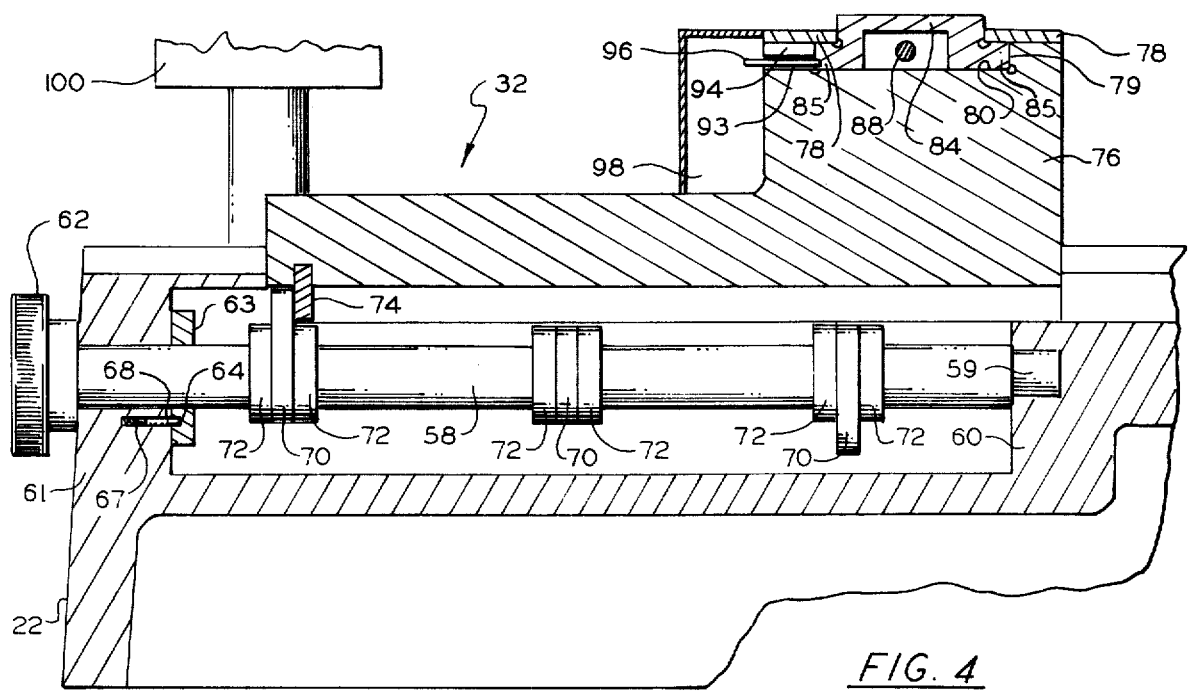
FIG. 4 is a fragmentary longitudinal section through the fixture taken on line 4—4 of FIG. 2.

Also in the base of the workpiece slide is a semi-cylindrical groove 54. Opposite the semi-cylindrical groove 54 is a semi-cylindrical groove 56 in the base upper surface 24, FIG. 3. Positioned in the groove 56 is a threaded rod 58, herein referred to as the multiple stop rod, the inner end of which is journalled in a bore 59 in the right or inner end wall 60 of the groove as best seen in FIGS. 4 and 6. The left end of rod 58 extends through the left end wall 61 of the groove where it terminates in a knurled knob 62, herein referred to as the multiple stop knob. A detent washer 63 is fixed on the rod just inside the wall 61 and has four semi-spherical cavities 64, spaced at 90° intervals about its circumference. In the wall 61 there is a spring 67 tipped with a ball 68, and the latter coacts with the four cavities 64 to provide four detent positions for the multiple stop knob 62.

Spaced along the threaded rod 58 are three tabs or stops 70 each of which is held in place by two nuts 72, FIGS. 4 and 6. The projecting lobes of these stops 70 are angularly displaced from one another by 90° with one of the lobes pointing upward for each of three of the detent positions of the multiple stop knob 62. In the vertical position these stops will abut a stop pin 74, which projects downwardly from the underside of the workpiece slide 32. The three stops 70 are positioned, in a manner to be described, along the threaded rod 58 to correspond to the three standard maximum turret clearances.

Figure 5:
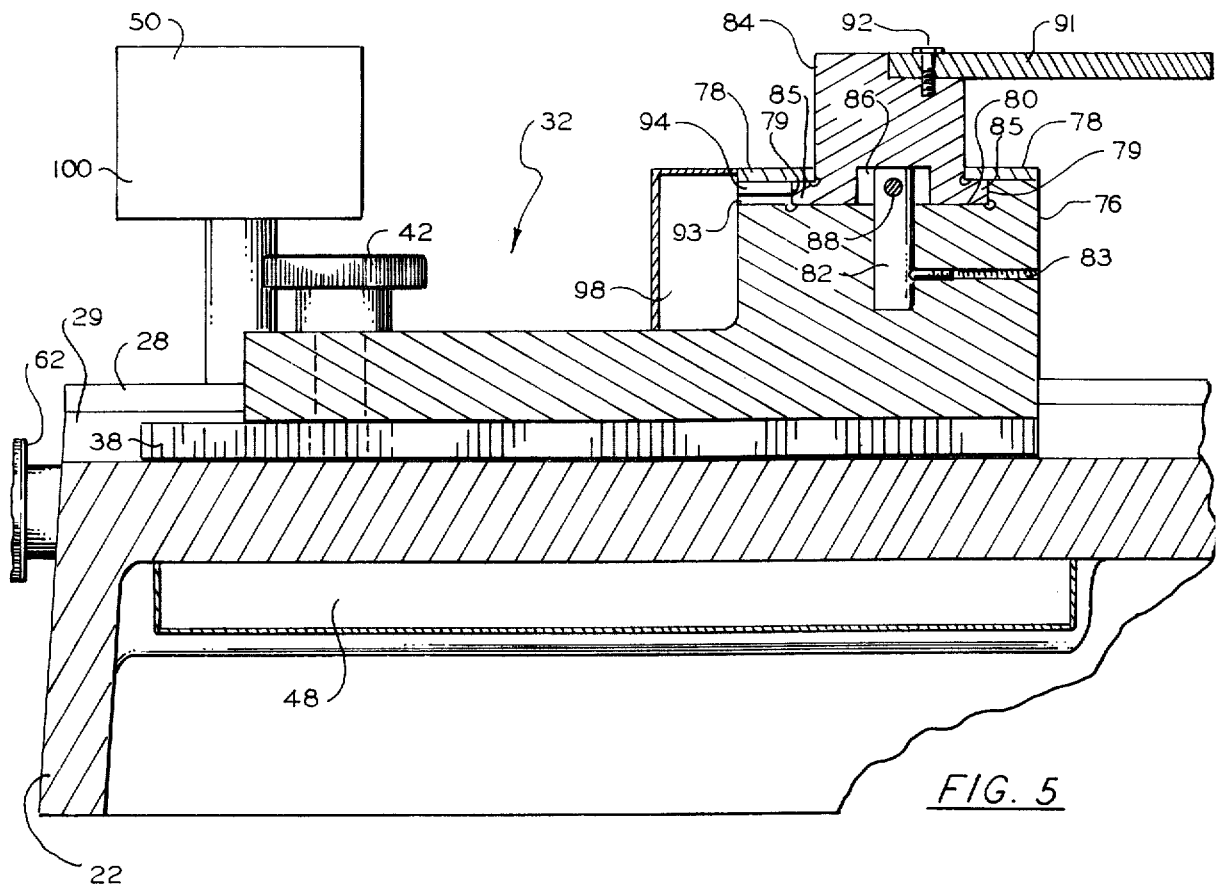
FIG. 5 is a fragmentary longitudinal section through the fixture taken on line 5—5 of FIG. 2.

On its right end, the workpiece slide 32 is formed with an integral, upstanding rectangular block 76, FIGS. 1, 5 and 6, the block having a transverse recess 77 in its upper surface. Metal strips 78 are connected to the upper surface of the block adjacent the side walls 79 of the recess. Extending inwardly beyond the side walls 79, the strips 78 form guides which, together with the lower surface of the recess 77, form a guideway 80. Projecting up into the guideway 80 is a cylindrical post 82, FIG. 5, which is held against rotational movement by a locking set screw 83.

A third slide 84, herein referred to as the diameter slide, is provided with side flanges 85 that are slidably received between the guides 78 and bottom of the guideway. The underside of slide 84 is formed with a slot 86 into which the upper end of post 82 extends as best shown in FIG. 5. As is the case with the workpiece slide 32 and turret slide 34, the diameter slide 84 is able to move in either direction in the guideway 80 to the extent of the length of slot 86, see FIG. 2. Passing through a slot 86 in the diameter slide and through a tapped hole in the cylindrical post 82 is a threaded rod 88 having a knurled knob 89 at its outer end. At its inner end, the rod passes through a wall of the diameter slide and is held in the slide by a nut 90. As the knob 89, herein referred to as the diameter slide adjustment knob, is manually turned, the threaded rod 88 acts through stationary post 82 to cause the slide 84 to move in the guideway 80.

A T-shaped reference pointer 91 is secured to the right edge of the diameter slide 84 by bolt 92, FIGS. 1, 2 and 5. As there are three sizes of screw machines for which the presetting fixture has been designed, there must be three interchangeable reference pointers of varying thicknesses that can be secured to this slide 84 (the specific reason for this will be described later).

Referring now to FIGS. 4 and 5, projecting from the left side of the diameter slide and passing through a slot 93 in the left guideway wall 94, is an actuator pin 96. Pin 96 is associated with a diameter encoder 98 secured to the outside of the left guideway wall. The diameter encoder is a duplicate of the length encoder 48 described previously, having an amplifier and digital readout device 100 with preset knob 101 and reset button 102. Also, as in length encoder 48, this encoder can be replaced by any accurate measuring means. Slot 93 must be sufficiently long to permit unrestricted movement of the diameter slide 84.

Figure 7:
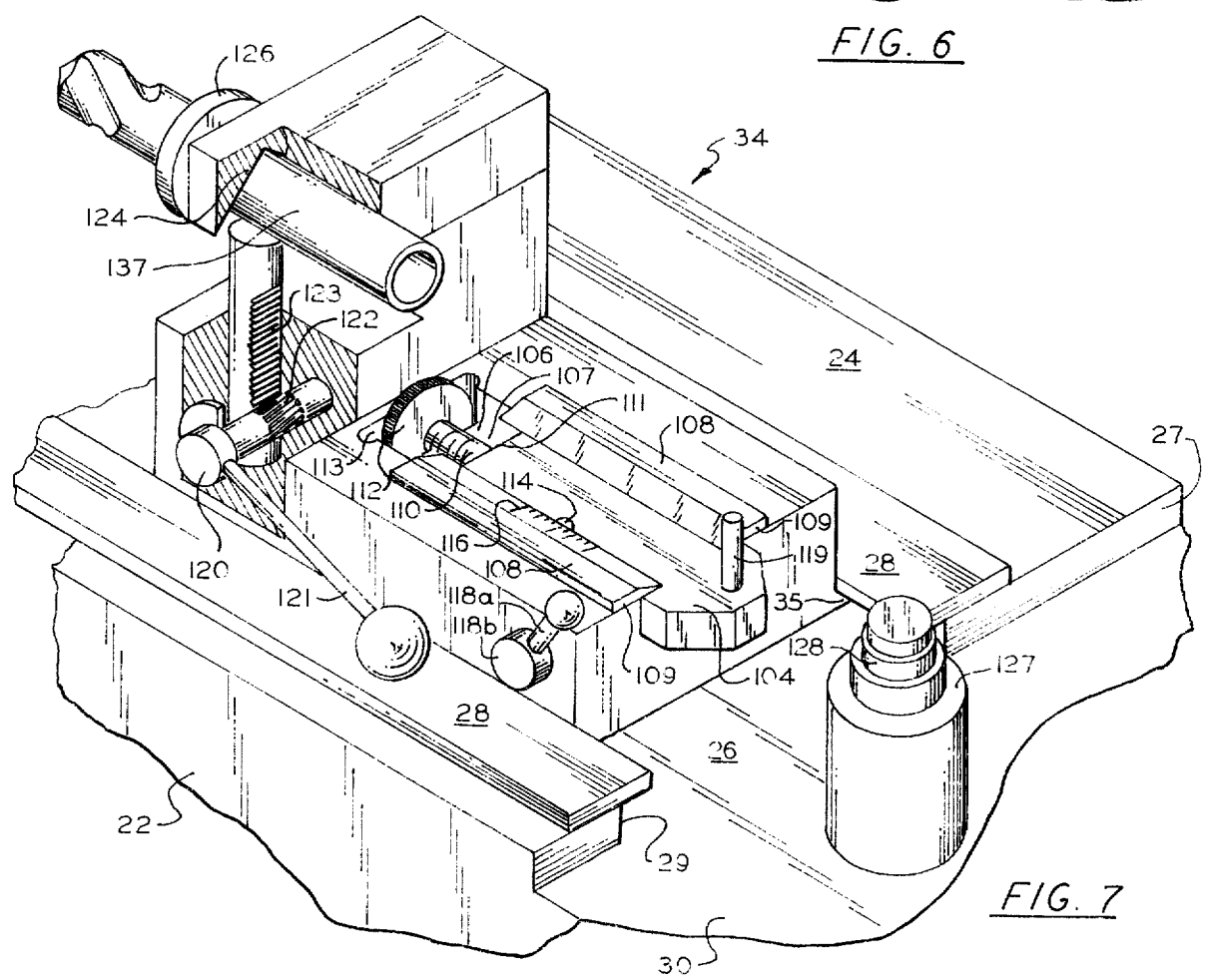
FIG. 7 is a fragmentary perspective view, with parts broken away, of the turret slide.

Turning now to the turret slide 34, as best seen in FIG. 7, within this slide is a fourth slide 104 herein referred to as the fine adjustment slide. The fine adjustment slide 104 is positioned in a guideway 106 formed by a recess 107 and guides 108 overlapping the edges 109 of said recess. A bolt 110 coacts with a tapped hole 111 in the slide 104 to provide means for moving the slide along the guideway 106. The bolt 110 is rotated by means of its knurled head 112, hereafter called the fine adjustment knob, the head being positioned in a closely conforming slot 113 to prevent longitudinal movement of the bolt. A reference point 114 on the fine adjustment slide permits this slide to be positioned relative to scale markings 116 on one of the guides. A slide lock consisting of a handle 118a and a set bolt 118b permits the fine adjustment slide 104 to be locked in place. At the right end of this slide is a cam follower 119.

On the left side of the turret slide 34 is a clamphandle 120 assembly commonly called a pump lock. This mechanism consists of a handle 121 connected to a pinion 122 in engagement with a helical rack 123. Clockwise movement of the handle 121 is converted into upward pressure at the upper end of rack 123. The rack in union with a V-block 124, positioned directly above it, provides an opening for receiving the shank of a turret tool holder, an example of which is seen at 126 in FIG. 1. This opening must be at least one inch in diameter to accommodate the shank of a No. 2 turret tool holder. As the rack 123 is forced upward, the tool holder becomes wedged within the V-block 124.

Because the shanks of the tool holders are of three different diameters, it is clear that when the tool holder is pinned against the V-block 124 by rack 123, the tool within the tool holder could be of three possible heights above the upper surface 24 of the base 20. The reference pointer 91 of the diameter slide 84, therefore, must correspond to three possible heights. For this reason three reference pointers of varying thicknesses can be interchangeably secured to the diameter slide 84 by use of set bolt 92.

Between the right end of the base and the step down 27 is a shaft 127 projecting up from the base. This shaft has a stepped series of three different sized hubs 128 at its upper end. The diameters of these hubs correspond to the inner diameters of the three standard sized turret cams. In FIG. 1 a typical cam 130 is mounted on the cam hub.

The operation of the presetting fixture is as follows: Before the first use of this device it may be necessary to make an initial adjustment of the stops 70 on the threaded rod 58. It is possible to preset these stops during construction but for further accuracy they should be adjusted for the individual automatic screw machine being preset. Because there are three standard size automatic screw machines having cams with diameters of 5½, 7 and 10 inches, there are three stops 70 that can be positioned. One is therefore not required to readjust a single stop each time a different size machine is preset.

To make this initial adjustment, the fine adjustment knob 112 is rotated causing it to move the fine adjustment slide 104 along its guideway 106. This rotation is continued until the reference point 114 registers with the zero position of the scale 116. The workpiece slide 32 is moved to the left end of its guideway by pinion 40 and rack 38 actuated by clockwise rotation of the workpiece slide adjustment knob 42. The turret slide 34 is manually moved to a position adjacent the workpiece slide 32. A turret cam 130, having at least one point on its rim with a radius equal to the largest cam lobe possible on a No. 2 automatic screw machine (5 inches), is mounted on the largest cam hub 128. With this largest lobe facing directly left, the turret slide 34 is manually moved to the right until the cam follower 119 on the fine adjustment slide 104 abuts the lobe of the cam.

The workpiece slide 32 is moved to the right by pinion 40 and rack 38 actuated by counterclockwise rotation of the workpiece slide adjustment knob 42, until the reference pointer 91 contacts the face of the turret slide 34. The length encoder 48 is zeroed by pressing reset button 52. The workpiece slide 32 is then moved to the left by clockwise rotation of the workpiece slide adjustment knob 42. As the slide moves along the guideway 30, actuator pin 44 moves along slot 46 and actuates the measuring means within the length encoder 48. When the digital readout device 50 registers 3 inches (the standard turret clearance for a No. 2 automatic screw machine), rotation of the adjustment knob is stopped. The leftmost stop 70 is positioned to abut the left side of stop pin 74, with stop 70 being in its upright position. The two nuts 72 on either side of this stop are tightened, thereby holding the stop in place.

The above steps are repeated to position the second and third stops 70. However, with a seven inch cam for a No. 0 automatic screw machine, the workpiece slide 32 is only moved to the left from zero position until the length encoder's readout device 50 registers 2¼ inches. Similarly, for a No. 00 automatic screw machine (5½ inch cam), the workpiece slide 32 is moved only until the digital readout device 50 registers 1 9/16 inches. Also, for each of these two stops a new detent position is achieved by rotating the multiple stop knob 62 90° before each stop 70 is set.

With the initial adjustment of the presetting fixture completed and while the automatic screw machine is continuing with production work, the tools for the next production job are preset within the tool holders. To facilitate the understanding of how this is to be done, the operation of this invention will be described as it would be used to preset the tools for the manufacturing of the representative part 132 seen in FIG. 10.

Knowing the size turret cam to be used, the multiple stop knob 62 is manually turned until the appropriate stop 70 points upwards. At this point spring 67 will force ball 68 into the semi-spherical cavity in the detent washer 63 causing the multiple stop rod 58 to be non-rotatably fixed.

By manually rotating the workpiece slide adjustment knob 42 clockwise, the pinion 40 will act in conjunction with the rack 38 to cause the workpiece slide 32 to move to the left. This rotating is continued until the workpiece is prevented from further movement by the stop pin 74 abutting the upwardly projecting stop 70. The length encoder's readout device is set to zero by pressing the reset button 52.

An estimated cutoff distance is computed, this distance being at least as great as the thickness of the cutoff tool 134 (for the representative part - 0.225) plus the thickness of that part 136 of the tool holder that will come between the cutoff tool and the collet when the tool is in cutting engagement with the workpiece (for the representative part - 0.185). The workpiece slide adjustment knob 42 is manually rotated counterclockwise causing the pinion 40 to act on the rack 38 and thereby move the slide to the right. This movement of the slide will cause actuator pin 44 to actuate the length encoder 48. This action is continued until the digital readout device 50 indicates that the slide has been moved through a distance equal to the estimated cutoff distance. The readout device is reset to zero by button 52.

The workpiece slide adjustment knob 42 is again rotated counterclockwise causing the rack 38 and pinion 40 arrangement to move the workpiece slide 32 further to the right. When the length encoder readout device 50 indicates that the workpiece slide 32 has moved through a distance equal to the total desired length of the finished piece (for the representative part - 1.060 inches), the rotation is stopped and the digital readout device 50 is again set to zero.

Through the above series of steps, the reference pointer 91 on the workpiece slide 32 has been positioned to indicate the end of the workpiece relative to the turret slide 34. When the workpiece slide was at its leftmost position after being stopped by the stop pin 74, the reference pointer 91 was at a position corresponding to the face of the collet of an actual machine, relative to the turret slide 34, where the leftmost face of the turret slide is considered to represent the turret circumference. By moving the reference pointer 91 towards the turret slide 34 various positions corresponding to positions on the workpiece can be simulated.

The first move of the reference pointer 91 towards the turret slide 34 is to compensate for the length of bar stock that will remain after the finished piece has been cut off. This distance can be imprecise because the cutoff tool is set within its holder with reference to the cutoff distance estimated here. In this manner the workpiece will be cut to an accurate length and the overestimated length will appear as uncut bar stock extending from the collet thereby becoming part of the next workpiece.

The second move of the workpiece slide 32 toward the turret slide 34 will position the reference pointer 91 at the end of the workpiece, and with the readout device 50 of the length encoder reset to zero the fixture is ready for use in positioning the turret cutting tools within their holders.

While normally the fine adjustment slide 104 is left with its reference point 114 in registry with the zero position on its guideway scale 116, there are circumstances such as abnormally short or long tools or an interference problem that call for an adjustment. An adjustment of slide 104 has the effect of simulating a change in the position of the turret in relation to the collet; therefore, this adjustment should only be made if it is possible to make a corresponding fine adjustment on the screw machine being preset. To make this adjustment, the fine adjustment knob 112 is rotated in the proper direction until the fine adjustment slide has moved to where its reference point 114 corresponds to the desired value on the guideway scale 116.

The reference pointer 91 is positioned approximately opposite the center of the opening created by the V-block 124 and the top of the rack 123. This is achieved by rotating the diameter slide adjustment knob 89 in the appropriate direction, thereby causing the threaded rod 88 to coact with the tapped post 82 and move the diameter slide 84.

The turret slide 34 is now manually moved to the left. The turret cam for the next production job is mounted on the cam hub 128. An example of this is seen in FIG. 1 where representative cam 130 is mounted on the cam hub 128. The turret cam 130 is now rotated until the first lobe is positioned opposite the cam follower 119. Since the first tool in normal operation is usually a stop tool, the stop tool will be considered the first tool for our demonstration workpiece.

The turret slide 34 is now moved to the right until the cam follower pin 119 abuts the turret cam's stop tool lobe. Positioned by the cam, the turret slide's left face is the same distance from the reference pointer 91 as the turret circumference would be from the end of the workpiece in an actual machine. The shank 137 of the tool holder 126, FIGS. 1 and 7, is placed in the opening created by the V-block 124 and the rack 123. The handle 121 of the pump lock 120 is rotated clockwise causing the pinion 122 to force rack 123 against the tool holder's shank 137, resulting in the tool holder 126 being firmly bound. The stop tool is inserted in the tool holder and moved axially within same until the working end of the tool abuts the reference pointer 91. A set bolt 138, FIG. 1, on the tool holder is then tightened to firmly bind the tool.

Any of a number of means can be used to determine the exact instance when the stop tool touches the reference pointer 91. One suggested means is an electrical circuit completed by this touching, with said circuit being connected to indicating means such as an electric lamp. When the lamp glows the reference pointer has touched the stop tool. A second suggested method is to have a magnifying glass with cross hairs mounted above the reference pointer 91. After the stop tool has been positioned and secured within the tool holder 126, said tool holder is removed by counterclockwise pressure on handle 121 of the pump lock.

Because the next tool that is usually mounted is a spot drill 139 the diameter slide measuring means must be calibrated. To set the diameter encoder 98, a measuring element such as a piece of bar stock will be placed in a new tool holder 126 held by the turret slide 34. The diameter slide 84 and the workpiece slide 32 are moved by rotating the appropriate slide adjustment knobs 42, 89 until one edge of the reference pointer 91 abuts the measuring element's circumference. The diameter encoder's readout device 100 is set to a value equal to the known diameter of the measuring element by preset knob 101. Rotating the diameter slide adjustment knob 89 until the readout device 100 of the diameter encoder registers a value of zero, will result in the edge of the reference pointer 91, which had previously touched the circumference of the measuring tool, now being centered in relation to the turret slide 34.

The diameter encoder 98 is calibrated to read at a ratio of 2 to 1; therefore, the digital readout device 100 will register a value equal to the diameter of a tool even though the diameter slide 84 has only been moved through the tool's radius. The cam is manually turned until the highest point on the spot drill cam lobe faces the cam follower 119. The turret slide is now moved to the right until the cam follower pin 119 abuts the spot drill cam lobe. To place a spot drill 139 within the tool holder, the diameter slide adjustment knob 89 is rotated until the readout device 100 of the diameter encoder registers a value equal to the diameter of the desired spot (for the representative part of FIG. 10 - 0.200). The workpiece slide adjustment knob 42 is then rotated until the linear length encoder's readout device 50 registers zero. The edge of the reference pointer 91 has now been positioned at a point equivalent to the desired inner diameter of the bar stock 140 after it has been spotted, FIG. 11. The spot drill 139 is positioned within the tool holder so that its drill point abuts against the reference pointer 91 as shown in FIG. 11. The set bolt 138 is tightened and the tool holder with the secured tool is replaced by an empty tool holder.

The next tool to be mounted is the drill. The cam is turned until the drill cam lobe faces the cam follower pin 119. The turret slide is now moved until the cam follower pin 119 abuts the drill cam lobe. The workpiece slide adjustment knob 42 is rotated clockwise until the length encoder's readout device 50 indicates that the workpiece slide 32 has moved to the left through a distance of 1.060 inches. In relation to the simulated turret circumference, the reference pointer 91 will now be positioned at the deepest desired penetration of the drill bit into the workpiece. The drill is positioned accordingly within the tool holder and by use of the set bolt 138 the tool is secured.

The next tool to be set is a boring tool. The turret slide 34 is adjusted as previously described and the shank of the boring tool is positioned within a tool holder 126 in the same manner as the drill was positioned, that is, the workpiece slide adjustment knob 42 is rotated clockwise until the linear length encoder's readout device 50 registers 0.500 inches. This indicates that the reference pointer 91 is positioned relative to the simulated turret circumference at the deepest desired penetration of the boring tool.

Besides being positioned longitudinally, it is necessary to position a boring tool with one side of the boring tool at the center of the desired bore and the other side of the tool (the cutting edge) at the circumference of the bore. To do this the diameter slide adjustment knob 89 is rotated until the diameter encoder's readout device 100 registers a value equal to the desired diameter of the bore hole (for the representative part of FIG. 10 - 0.200). The tool is positioned offcenter with the cutting edge of the boring tool abutting the reference pointer 91, by use of the offcenter mechanism (not shown) of the tool holder. The offcenter mechanism is then tightened to lock the tool in place.

Figure 8:
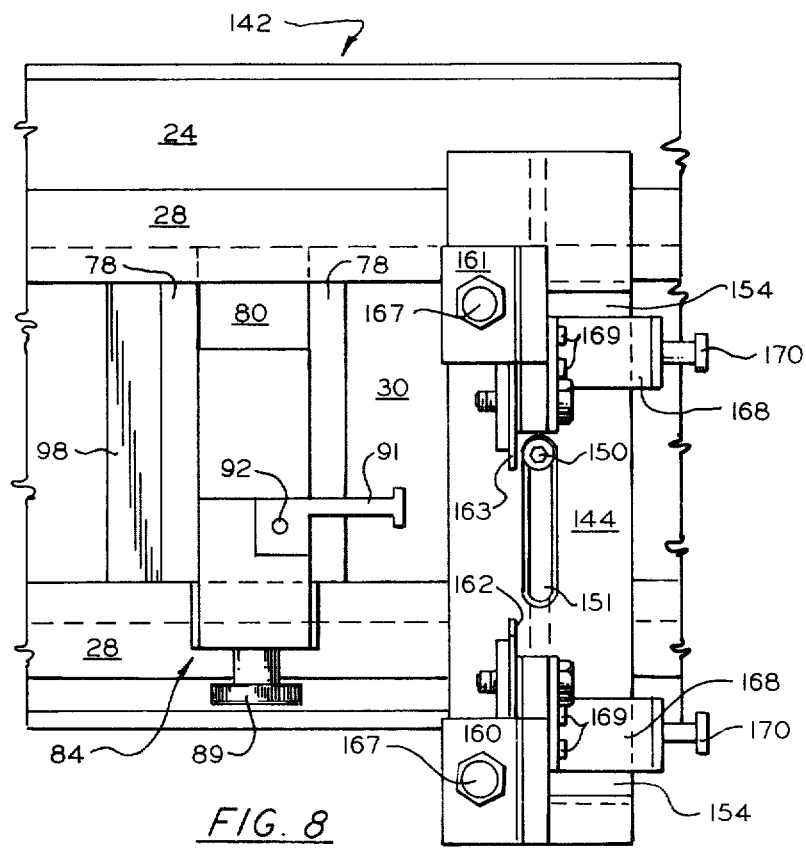
FIG. 8 is a top view of the cross slide presetting attachment.
Figure 9:
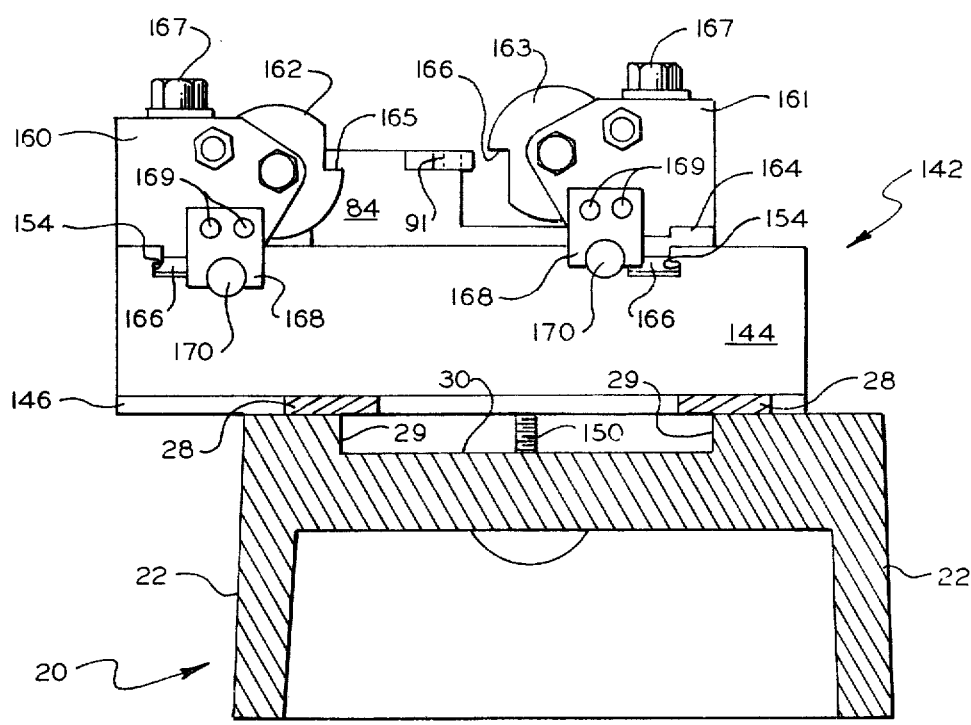
FIG. 9 is a right side elevation of the mechanism of FIG. 8.

The circular-forming tools are preset within cross slide holders by means of an attachment generally indicated by 142, in FIGS. 8 and 9. This attachment, herein referred to as the cross slide mount, is primarily a rectangular block of rigid metal 144. Since there are three standard automatic screw machines each with a different size cross slide, there must be three different sizes of cross slide mounts. The length (the dimension running from left to right in FIG. 9) of these mounts isn't critical as long as it is of sufficient length to accommodate two cross slide holders and their circular-forming tools. The width of the mount 142, however, should be at least as wide as the cross slides of the actual automatic screw machine being simulated.

A locating key 146 on the underside of block 144 fits in keyway 148, FIGS. 1 and 2, in guides 28 of the base 20. The key 146 is positioned relative to the right edge of the mount 142, thereby causing same to correspond to the right edge of the cross slides of the machine being simulated. A bolt 150 passing through slot 151 in the block secures same to a tapped hole 152 (FIGS. 1 and 2) in the base. Two T-shaped keyways 154 running perpendicular to the length of this block enable the mount 142 to simulate similar keyways of an automatic screw machine.

In the operation of this attachment, the turret cam 130 can be removed and the turret slide 34 moved out of position, towards the cam hub 128. The cross slide mount 142 is positioned and secured as described above.

The cross slide tool holders 160 and 161 in FIGS. 8 and 9, with their circular-forming tools 162, 163, are positioned in the keyways 154. Between the back cross slide holder 161 and the cross slide block 144 is a representative riser block 164 used during the operation of an automatic screw machine to raise the back tool holder to position the cutting tool above the bar stock. The tool holder 160 is moved over the cross slide 144 until the circular forming tool 162 abuts the reference pointer 91. The T bolt 166 is tightened by nut 167 until the tool holder 160 is firmly held. Adjustment bracket 168 is secured by bolts 169 engaging tapped holes presently in all standard cross slide tool holders. Adjustment bolt 170 is rotated until its tip abuts the mount. The above process is repeated to preset the back circular forming tool 163 within the back cross slide holder 161.

Next the circular-forming tools 162, 163 are preset to correspond to the center of the workpiece. As each of the reference pointers 91 must have some thickness each has been given the thickness of their corresponding riser blocks 164. This allows the cutting edge 165 of the front circular-forming tool 162, without the use block 164, to correspond to the center of the workpiece when the edge 165 abuts the underside of the reference pointer 91, as can be seen in FIG. 9. The cutting edge 166 of the tool 163 with the riser block corresponds to the center of the workpiece when the edge abuts the top of the reference pointer 91, as can be seen in FIG. 9.

Slot 151 permits the circular forming tool to be positioned adjacent a tool held within a tool holder 126 in the V block 124. This permits a check for possible interference between the circular-forming tools 162, 163 and an end forming tool.

Transfer of these cross slide tool holders 160 and 161 to the automatic screw machine is accomplished by merely loosening nuts 167 and sliding the tool holders 160, 161 into the keyway of the cross slides until the tip of the adjustment bolts 170 prevents further motion. The T bolts 166 are tightened by nuts 167 until the tool holders 160 and 161 are securely held to the cross slides. The adjustment brackets 168 can be removed if desired.

From the foregoing description, it will be apparent that the present invention provides a novel and very useful presetting fixture for an automatic screw machine. As will be understood by those familiar with the art, the invention may be embodied in other specific forms without departing from the spirit or essential characteristics thereof.

I claim:

1. A presetting fixture for a cam actuated turret lathe including:
   a rigid base having a guideway;
   a support member on the base on which a turret cam, to be used for presetting, can be mounted;
   a first and a second slide each independently movable in the guideway;
   turret-collet simulating means including retaining means on the first slide in which a turret tool holder can be held and reference means on the second slide for representing axial positions on a workpiece held by a collet;
   a cam follower on either of said slides to permit said slide to be positioned by the lobes of the turret cam mounted on the support member;
   measuring means on the other slide for determining its position relative to the slide with the cam follower; and
   diameter reference means operably connected to the second slide for positioning a tool off center within the turret tool holder, the diameter reference means including a diameter guideway in the second slide running perpendicular to the base guideway, a diameter slide movable in said diameter guideway, and diameter measuring means for determining the position of the diameter slide within its guideway.

2. A presetting fixture for a cam actuated turret lathe including:
   a rigid base having a guideway;
   a support member on the base on which a turret cam, to be used for presetting, can be mounted;
   a first and a second slide each independently movable in the base guideway;
   retaining means on the first slide in which a tool holder can be held;
   a diameter guideway in the second slide running perpendicular to the base guideway;
   a diameter slide movable in said diameter guideway;
   diameter measuring means responsive to movement of the diameter slide whereby the latter's position within the diameter guideway can be determined;
   a fine adjustment guideway in the first slide running parallel to the base guideway;
   a fine adjustment slide movable in said fine adjustment guideway;
   a fine adjustment measuring means for determining the position of the fine adjustment slide in its guideway;
   a cam follower on the fine adjustment slide to position the first slide in the base guideway by means of the lobes of the turret cam mounted on the support member;
   a reference means carried by the second slide; and
   length measuring means responsive to movement of the second slide for determining its position relative to the position of the first slide.

3. The presetting fixture for a cam actuated turret lathe as defined in claim 2 including:
   a rigid block mountable on the base;
   at least one keyway in said block in which a cross slide tool holder may move, said keyway positioned to coact with the reference means; and
   bracket means for marking the position of the preset cross slide tool holder in the keyway of the cross slide tool presetting means.

* * * * *